(12) United States Patent
Symanow et al.

(10) Patent No.: US 9,994,108 B2
(45) Date of Patent: Jun. 12, 2018

(54) REGENERATIVE BRAKING POWER DISTRIBUTION

(71) Applicant: Ford Global Technologies, LLC, Dearborn, MI (US)

(72) Inventors: David Anthony Symanow, Plymouth, MI (US); Daniel Benjamin Kok, Ann Arbor, MI (US); Derek Hartl, Birmingham, MI (US); Jeffrey Raymond Mohr, Shelby Township, MI (US); William David Treharne, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 165 days.

(21) Appl. No.: 15/250,128

(22) Filed: Aug. 29, 2016

(65) Prior Publication Data

US 2018/0056790 A1 Mar. 1, 2018

(51) Int. Cl.
*B60L 7/16* (2006.01)
*B60L 1/00* (2006.01)
*B60K 6/448* (2007.10)
*B60L 11/18* (2006.01)

(52) U.S. Cl.
CPC .............. *B60L 7/16* (2013.01); *B60K 6/448* (2013.01); *B60L 11/1814* (2013.01); *B60L 11/1868* (2013.01); *B60L 2210/10* (2013.01); *B60L 2240/527* (2013.01); *B60Y 2200/92* (2013.01); *B60Y 2300/91* (2013.01); *B60Y 2400/61* (2013.01); *Y10S 903/947* (2013.01)

(58) Field of Classification Search
CPC ........ B60L 7/16; B60L 6/448; B60L 11/1814; B60L 11/1868; B60L 2210/10; B60L 2240/527; B60Y 2200/92; B60Y 2300/91; B60Y 2400/61; Y10S 903/947
USPC .................................................. 307/9.1, 10.1
See application file for complete search history.

(56) References Cited

U.S. PATENT DOCUMENTS

| | | |
|---|---|---|
| 2015/0251653 A1 | 9/2015 | Banker et al. |
| 2015/0353035 A1 | 12/2015 | Ferrel et al. |
| 2016/0121725 A1 | 5/2016 | Shin et al. |

*Primary Examiner* — Hal Kaplan
(74) *Attorney, Agent, or Firm* — David Kelley; Brooks Kushman P.C.

(57) ABSTRACT

A vehicle system includes a voltage converter configured to electrically isolate and convert power transferred between high voltage (HV) and low voltage (LV) busses, and a controller configured to, responsive to regenerative power exceeding a charge power limit of a traction battery receiving charge via the HV bus, increase an output voltage of the converter to initiate transfer of some of the regenerative power to an auxiliary battery connected with the LV bus.

20 Claims, 2 Drawing Sheets

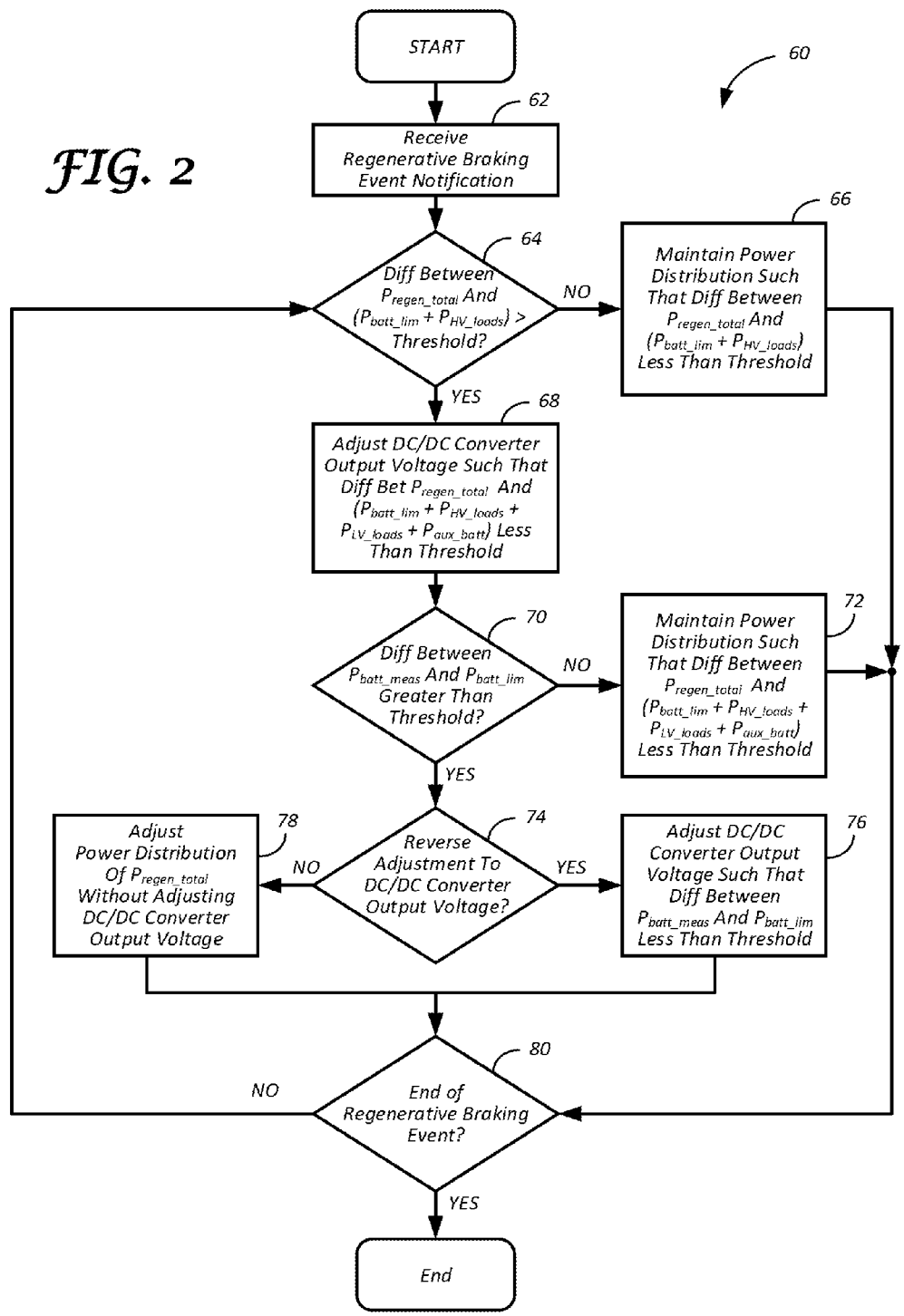

REGENERATIVE BRAKING POWER DISTRIBUTION

TECHNICAL FIELD

The present disclosure generally relates to systems and methods for distributing regenerative braking power.

BACKGROUND

Hybrid-electric vehicles can include an internal combustion engine (ICE), at least one electrical machine that may be configured as an electric motor or as an electric generator and a traction battery. The traction battery provides power to the electrical machine for propulsion and supplies certain accessory loads. Vehicles that utilize a high voltage traction battery may be referred to as electrified vehicles. The traction battery has a state of charge (SOC) that indicates how much electric charge may be available in the battery. To increase the SOC, a hybrid-electric vehicle may employ multiple methods including charging the traction battery using the momentum of the vehicle to turn a generator, operating the ICE to turn the electrical machine configured as a generator, and electrically coupling the traction battery to an external charging source, also referred to as "plugging in" the car.

SUMMARY

A vehicle system includes a voltage converter configured to electrically isolate and convert power transferred between high voltage (HV) and low voltage (LV) busses, and a controller configured to, responsive to regenerative power exceeding a charge power limit of a traction battery receiving charge via the HV bus, increase an output voltage of the converter to initiate transfer of some of the regenerative power to an auxiliary battery connected with the LV bus.

A method for a vehicle includes, responsive to regenerative power being greater than a charge power limit of a traction battery, regulating by a controller an output of a voltage converter configured to electrically isolate and convert power transferred between high voltage (HV) and low voltage (LV) busses such that some of the regenerative power is transferred from the HV bus to the LV bus to charge an auxiliary battery.

A braking system for a vehicle includes an electric machine configured to charge a traction battery via a high voltage (HV) bus by applying opposing torque to a rotational motion of an engine, a voltage converter configured to electrically isolate and convert power transferred between the HV bus and a low voltage (LV) bus, and a controller configured to, responsive to an amount of power generated from application of the opposing torque being greater than a charge power limit of the battery, increase an output voltage of the converter to initiate transfer of some of the power to the LV bus.

BRIEF DESCRIPTION OF THE DRAWINGS

FIG. 2 is a flowchart illustrating an algorithm for selectively distributing power generated during a regenerative braking event.

DETAILED DESCRIPTION

Figure 1:
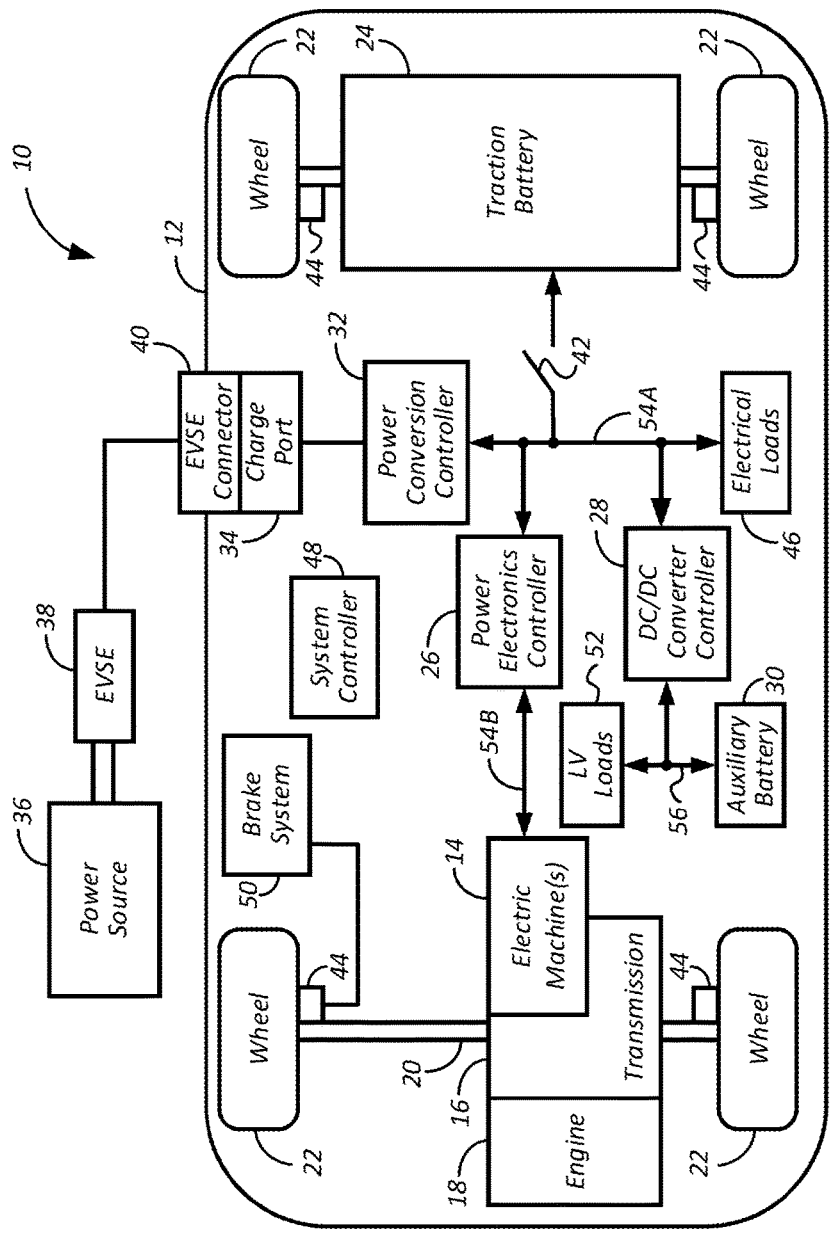
FIG. 1 is a block diagram of a plug-in hybrid electric vehicle illustrating a typical drivetrain and energy storage components.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

FIG. 1 depicts a vehicle system 10 for a plug-in hybrid-electric vehicle 12. The vehicle 12 may comprise one or more electrical machine 14 mechanically coupled to a hybrid transmission 16. The electrical machine 14 may be capable of operating as a motor or a generator. In addition, the hybrid transmission 16 is mechanically coupled to an engine 18. The hybrid transmission 16 is also mechanically coupled to an axle 20 mechanically coupled to wheels 22. While FIG. 1 depicts a typical hybrid electric vehicle, the description herein is equally applicable to a pure electric vehicle or a hybrid electric vehicle of a different configuration, such as, but not limited to, a series hybrid. For a pure electric vehicle, e.g., battery electric vehicle (BEV), the hybrid transmission 16 may be a gear box connected to the electrical machine 14 and the engine 18 may not be present.

The electrical machine 14 can provide propulsion and deceleration capability either while the engine 18 is operated or turned off. In one example, the vehicle 12 may be operated in electric-only mode using the electrical machine 14 as the sole source of propulsion when the engine 18 is off. The electrical machine 14 are further capable of operating as generators and provide fuel economy benefits by recovering energy that would normally be lost as heat in a friction braking system, e.g., a brake system 50. In this so-called regenerative mode, the electrical machine 14 may impart a reaction torque, i.e., apply regenerative braking, against the engine 18 output torque to generate electricity while the vehicle 12 is operating. In one example, the electrical machine 14 may contribute to deceleration of the vehicle 12 using a drag, or negative torque, e.g., by selectively locking an impeller and turbine using a torque converter bypass clutch.

A system controller 48 may be present to coordinate the operation of the various components. The system controller 48, although represented as a single controller, may be implemented as one or more controllers. In one example, the system controller 48 may be configured to control distribution of power, such as power generated during a regenerative braking event, to one or more systems or sub-systems of the vehicle 12. In one example, the system controller 48 may be configured to determine an amount of braking torque that may be necessary to meet a driver torque braking request. In another example, the system controller 48 may be configured to determine an amount of power that may be generated as a result of applying a given amount of braking torque.

A traction battery 24 may store energy that can be used by the electrical machine 14. The system controller 48 may monitor operating conditions of the traction battery 24 and the electrical machine 14. In one example, the system controller 48 may be configured to receive signals indicative of magnitude and direction of current flow through the traction battery 24, voltage level across terminals of the traction battery 24, and so on. The traction battery 24 typically provides a high voltage direct current (DC) output. One or more contactors 42 may isolate the traction battery 24 from a DC high voltage bus 54A when opened and couple the traction battery 24 to the DC high voltage bus 54A when closed.

The traction battery 24 is electrically coupled to one or more power electronics controllers 26 via the DC high voltage bus 54A. The power electronics controller 26 is also electrically coupled to the electrical machine 14 and provides the ability to bi-directionally transfer energy between AC high voltage bus 54B and the electrical machine 14. For example, the traction battery 24 may provide a DC output while the electrical machine 14 may operate using a three-phase alternating current (AC) to function. The power electronics controller 26 may convert the DC output of the traction battery 24 to a three-phase AC input that may be necessary to operate the electrical machine 14. In a regenerative mode, the power electronics controller 26 may convert the three-phase AC output from the electrical machine 14 acting as generators to the DC input compatible with one or more systems or sub-systems of the vehicle 12.

In addition to providing energy for propulsion, the traction battery 24 may provide energy for other vehicle electrical systems. A vehicle 12 may include a DC/DC converter 28 that is electrically coupled to the DC high voltage bus 54A. The DC/DC converter 28 may be electrically coupled to a low voltage bus 56. The DC/DC converter 28 may include a controller and may be configured to convert the high voltage DC output of the traction battery 24 and/or the power electronics controller 26 to a low voltage DC supply that is compatible with one or more systems electrically coupled to the low voltage bus 56. The low voltage bus 56 may be electrically coupled to, for example, one or more low voltage loads 52 and an auxiliary battery 30 (e.g., 12V battery). The low voltage loads 52 may include systems and subsystems within the vehicle 12, such as, but not limited to, lighting system, electrical accessories, and so on.

One or more high voltage electrical loads 46 may be coupled to the DC high voltage bus 54A. The high voltage loads 46 may have an associated controller that operates and controls the high voltage loads 46 in response to receiving one or more predefined signals or commands. The high voltage loads 46 may include, among other components, compressors and electric heaters. The various components discussed may have one or more associated controllers to control and monitor the operation of the components. The high voltage loads 46 may consume a predefined amount of power, $P_{HV\_loads}$. In one example, the high voltage loads 46 may consume a predefined amount of power, $P_{HV\_loads}$ available on the DC high voltage bus 54A.

The traction battery 24 of vehicle 12 may be recharged by an external power source 36 electrically coupled to a charger or electric vehicle supply equipment (EVSE) 38. The external power source 36 may be an electrical power distribution network or grid as provided by an electric utility company. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12 and may be electrically coupled to a charger or on-board power conversion controller 32 that conditions the power supplied from the EVSE 38 to provide the proper voltage and current levels to the traction battery 24.

The system controller 48 may be configured to maintain the SOC of the traction battery 24 within a predefined operating range, e.g., an upper and lower limit. In one example, the system controller 48 may be configured to command the power conversion controller 32 to enable charging of the traction battery 24 in response to the SOC being less than a predefined threshold. The system controller 48 may determine the SOC of the traction battery 24 based on signals from one or more sensors, such as current and voltage sensors of the traction battery 24. The system controller 48 may be configured to implement various techniques to determine the SOC of traction battery 24, such as, but not limited to, an ampere-hour integration, e.g., integrating current through the traction battery 24 over time. The system controller 48 may be further configured to determine the SOC of traction battery 24 based on, for example, the output of a traction battery voltage sensor. The specific technique utilized may depend upon the chemical composition and characteristics of a given traction battery 24.

The system controller 48 may further be in communication with a brake system 50 including a brake system controller (not shown) configured to monitor and coordinate deceleration of the vehicle 12. The controller of the brake system 50 may monitor and control one or more brake components, such as, but not limited to, wheel brakes 44 configured to enable vehicle 12 deceleration. The wheel brakes 44 may be hydraulically actuated, electrically actuated, or some combination thereof. For simplicity, the figure depicts a single connection between the brake system 50 and one of the wheel brakes 44. A connection between the brake system 50 and the other wheel brakes 44 is implied.

The wheel brakes 44 of the brake system 50 may be applied to reduce the torque, $t_{final}$ and speed, $\omega_{final}$ at the wheels 22. In one example, the wheel brakes 44 may include a rotor coupled to the axle 20 and a caliper disposed around the rotor and coupled to the vehicle 12, commonly referred to as a disk brake, such that when the caliper is applied it squeezes the rotor and the friction between the two reduces the torque and speed at the wheels 22. Other brakes for the wheels 22, such as, but not limited to, drum brakes are also contemplated.

In one example, the controller of the brake system 50 may be configured to receive a signal, such as, but not limited to, via a brake pedal position sensor, indicative of a driver request to decelerate the vehicle 12. In another example, the controller of the brake system 50 may be configured to operate autonomously to implement features such as stability control. The controller of the brake system 50 may be configured to apply a requested braking torque at the wheels 22 in response to a request from another vehicle controller of the vehicle 12, e.g., in response to a request from the system controller 48.

The system controller 48 may be configured to receive one or more signals indicating a request to decelerate the vehicle 12. In one example, an application of a brake pedal may generate a braking input signal that is interpreted by the system controller 48 as a command to decelerate the vehicle 12. The system controller 48 may determine a total power, $P_{regen\_total}$ that may be generated from a given braking event based on one or more of an amount of requested braking torque, $t_{demand}$, vehicle speed, v, and so on.

The system controller 48 may issue one or more commands to cause a predefined amount of negative torque, $t_{applied}$ to be applied, e.g., negative torque applied to an output shaft by the engine 18 and/or by the electrical machine 14, such that an amount of applied torque, $t_{applied}$ meets requested braking torque, $t_{demand}$. Additionally or alternatively, the system controller 48 may issue one or more commands to activate the brake system 50 to inhibit rotation of the wheels 22 using resistance of the wheel brakes 44. The negative torque values provided by both of the engine 18, the electrical machine 14, and the wheel brakes 44 may be allocated to vary the amount by which each satisfies driver braking demand.

The system controller 48 may be configured to control amount of power, $P_{regen\_total}$ captured in a given regenerative braking event. The system controller 48 may, for instance, control distribution of the power, $P_{regen\_total}$ to one or more components of the vehicle 12 configured to receive regenerative braking event power, such as, but not limited to, the traction battery 24. In one example, the system controller 48 may be configured to control captured amount of and/or distribution of regenerative braking event power, $P_{regen\_total}$ according to one or more power limits associated with the one or more vehicle 12 components.

The system controller 48 may be configured to determine a charge power limit, $P_{batt\_lim}$ of the traction battery 24. The charge power limit, $P_{batt\_lim}$ of the traction battery 24 may be a maximum instantaneous amount of charge power, current, or another operating parameter that may be applied to the traction battery 24 in order to achieve one or more predefined battery performance characteristics, including charging of the traction battery 24. In one instance, the charge power limit, $P_{batt\_lim}$ of the traction battery 24 may be based on one or more of battery age, cell chemistry, cell configuration, battery and/or cell SOC, battery and/or cell temperature, and ambient temperature among others. The charge power limit, $P_{batt\_lim}$ of the traction battery 24 may, in one example, be set by a manufacturer during design, testing, or another stage of production of the traction battery 24. In another example, the charge power limit, $P_{batt\_lim}$ of the traction battery 24 may be based on a value of one or more battery operating parameters during a given ignition cycle. In still another example, the charge power limit, $P_{batt\_lim}$ of the traction battery 24 may be based on a value of one or more battery operating parameters as measured during a given regenerative braking event.

In one example, the system controller 48 may determine a charge power limit, $P_{batt\_lim}$ of the traction battery 24 using, for example, an algebraic propagation technique. Other methods for determining a charge power limit, $P_{batt\_lim}$, such as a model-based maximum power estimation method for determining a maximum current/power capability over a fixed horizon considering both thermal and electrical constraints independently, are also contemplated.

The system controller 48 may be configured to compare the power, $P_{regen\_total}$ generated during a given regenerative braking event to the charge power limit, $P_{batt\_lim}$ of the traction battery 24. In one example, the system controller 48 may be configured to compare the power, $P_{regen\_total}$ generated during a given regenerative braking event to a sum of an amount of power, $P_{HV\_loads}$ consumed by the high voltage loads 46 and the charge power limit, $P_{batt\_lim}$ of the traction battery 24. In another example, the system controller 48 may be configured to determine whether a difference between the amount of power, $P_{regen\_total}$ generated during a given regenerative braking event and the sum of an amount of power, $P_{HV\_loads}$ consumed by the high voltage loads 46 and the charge power limit, $P_{batt\_lim}$ associated with the traction battery 24 is greater than a predefined threshold.

In response to a difference between the amount of power, $P_{regen\_total}$ generated during a given regenerative braking event and the sum of an amount of power, $P_{HV\_loads}$ consumed by the high voltage loads 46 and the charge power limit, $P_{batt\_lim}$ associated with the traction battery 24 being greater than a predefined threshold, the system controller 48 may be configured to issue one or more commands such that a difference between the amount of power, $P_{regen\_total}$ generated during a given regenerative braking event and the sum of an amount of power, $P_{HV\_loads}$ consumed by the high voltage loads 46 and the charge power limit, $P_{batt\_lim}$ associated with the traction battery 24 is less than a predefined threshold. The system controller 48 may, for instance, issue a command to the brake system 50 to absorb an amount of power in excess of the sum such that the total applied braking torque, $t_{applied}$ corresponds to the requested braking torque, $t_{demand}$. In response to receiving the request, the brake system 50 may be configured to control the wheel brakes 44 to inhibit rotation of the wheels 22 using a predefined amount of friction brake torque, $t_{friction}$ such that the total applied braking torque $t_{applied}$ corresponds to the requested braking torque, $t_{demand}$.

Additionally or alternatively, in response to a difference between the amount of power, $P_{regen\_total}$ generated during a given regenerative braking event and the sum of an amount of power, $P_{HV\_loads}$ consumed by the high voltage loads 46 and the charge power limit, $P_{batt\_lim}$ associated with the traction battery 24 being greater than a predefined threshold, the system controller 48 may be configured to issue one or more commands such that at least a portion of the generated power, $P_{regen\_total}$ in excess of the sum is directed to one or more systems operating on the low voltage bus 56. In one example, the system controller 48 may be configured to regulate output voltage of the DC/DC converter 28 such that one or more of the low voltage loads 52 and the auxiliary battery 30 receive at least a portion of power, $P_{regen\_total}$ generated during a given regenerative braking event. In another example, the system controller 48 may regulate output voltage of the DC/DC converter 28 such that one or more components of the vehicle 12 connected to the low voltage bus 56, e.g., the low voltage loads 52, the auxiliary battery 30 and so on, receive a portion of power, $P_{regen\_total}$ in excess of the sum of an amount of power, $P_{HV\_loads}$ consumed by the high voltage loads 46 and the charge power limit, $P_{batt\_lim}$ associated with the traction battery 24. In such an example, following an adjustment of output voltage of the DC/DC converter 28, difference between the amount of power, $P_{regen\_total}$ captured during the regenerative braking event and the sum of the charge power limit, $P_{batt\_lim}$ the traction battery 24, an amount of power, $P_{HV\_loads}$ consumed by the high voltage loads 46, an amount of power, $P_{LV\_loads}$ consumed by the low voltage loads 52, an amount of power, $P_{aux\_batt}$ consumed by the auxiliary battery 30 may be less than a predefined threshold, i.e., $P_{regen\_total} - (P_{batt\_lim} + P_{HV\_loads} + P_{LV\_loads} + P_{aux\_batt}) <$ threshold.

The system controller 48 may be further configured to determine whether a difference between an amount of power, $P_{batt\_meas}$ supplied to the traction battery 24, e.g., as measured by a traction battery sensor, and a charge power limit, $P_{batt\_lim}$ associated with the traction battery 24 is greater than a predefined threshold. The charge power limit, $P_{batt\_lim}$ may be same or different as the charge power limit, $P_{batt\_lim}$ determined at a time when the system controller 48 receives a regenerative braking event notification. In response to determining that a difference between the power, $P_{batt\_meas}$ supplied to the traction battery 24 and the charge power limit, $P_{batt\_lim}$ associated with the traction battery 24 is less than a predefined threshold, the system controller 48 may be configured to maintain power, $P_{regen\_total}$ distribution such that $P_{regen\_total} - (P_{batt\_lim} + P_{HV\_loads} + P_{LV\_loads} + P_{aux\_batt})$ is less than a predefined threshold.

In response to determining that a difference between the power, $P_{batt\_meas}$ supplied to the traction battery 24 and the charge power limit, $P_{batt\_lim}$ associated with the traction battery 24 is greater than a predefined threshold, the system controller 48 may be configured to determine whether an adjustment to an output voltage of the DC/DC converter 28 should be reversed. In one example, the system controller 48 may determine whether the adjustment to the output voltage of the DC/DC converter 28 should be reversed based on whether an amount of power, $P_{regen\_total}$ being captured during a given regenerative braking event is less than a predefined threshold due to, for example, but not limited to, a decrease in amount of requested braking torque, $t_{demand}$, reaching a maximum available amount of torque, and so on.

In response to determining that the adjustment to the output voltage of the DC/DC converter 28 should be reversed, the system controller 48 may be configured to adjust output voltage of the DC/DC converter 28 such that a difference between the power, $P_{batt\_meas}$ supplied to the traction battery 24 and the charge power limit, $P_{batt\_lim}$ associated with the traction battery 24 is less than a predefined threshold. In one example, the system controller 48 may decrease output voltage of the DC/DC converter 28 such that a difference between the power, $P_{batt\_meas}$ supplied to the traction battery 24 and the charge power limit, $P_{batt\_lim}$ associated with the traction battery 24 is less than a predefined threshold.

In response to determining that the adjustment to the output voltage of the DC/DC converter 28 should not be reversed, the system controller 48 may be configured to, without adjusting the output voltage of the DC/DC converter 28, control power $P_{regen\_total}$ distribution such that a difference between the power, $P_{batt\_meas}$ supplied to the traction battery 24 and the charge power limit, $P_{batt\_lim}$ associated with the traction battery 24 is less than a predefined threshold, such as by increasing power, $P_{regen\_total}$ being captured during a given regenerative braking event, e.g., additional power available in meeting the requested braking torque, meeting maximum available amount of torque, and so on.

The system controller 48 may be further configured to determine whether a given regenerative braking event has ended. In one example, the system controller 48 may be configured to determine that a given regenerative braking event has ended in response to receiving a signal from one or more controllers, sensors, or other components associated with the vehicle 12, e.g., the brake system 50, the electrical machine 14, and so on.

The system controller 48 and other controllers of the vehicle 12 may communicate via a serial bus (e.g., Controller Area Network (CAN)) or via discrete conductors. The system controller 48 and other controllers communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the system controller 48 may communicate signals to and/or from the transmission controller. Additionally, the system controller 48 may communicate with other vehicle controllers as discussed above, or directly with vehicle sensor and/or components including the engine 18, the power electronics controller 26, and the braking system 50.

Although not explicitly illustrated, those of ordinary skill in the art will recognize various functions or components of the vehicle 12 that may be controlled by the system controller 48 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, electrical machine operation, clutch pressures for one or more clutches, e.g., disconnect clutch, launch clutch and so on, torque converter bypass clutch, transmission gearbox, and the like. One or more sensors communicating input through the I/O interface may be used to indicate crankshaft position, engine rotational speed (RPM), wheel speeds, vehicle speed, engine coolant temperature, intake manifold pressure, accelerator pedal position, ignition switch position, throttle valve position, air temperature, exhaust gas oxygen or other exhaust gas component concentration or presence, intake air flow, transmission gear, ratio, or mode, transmission oil temperature, transmission turbine speed, torque converter bypass clutch status, deceleration, or shift mode, for example.

In reference to FIG. 2, a process 60 for distributing regenerative braking power is shown. The process 60 may begin at block 62 where the system controller 48 receives a regenerative braking event notification. In one example, the system controller 48 may receive a signal indicative of a regenerative braking event from one or more controllers, sensors, or other components associated with the brake system 50. In another example, the system controller 48 may be configured to receive a signal indicating that one or more of the electrical machine 14 is operating in a regenerative mode, such as, contributing opposing torque to output torque of engine 18.

The system controller 48 may determine at block 64 whether a difference between the amount of power, $P_{regen\_total}$ generated during a given regenerative braking event and the sum of an amount of power, $P_{HV\_loads}$ consumed by the high voltage loads 46 and the charge power limit, $P_{batt\_lim}$ associated with the traction battery 24 is greater than a predefined threshold. In one example, the system controller 48 may determine amount of power, $P_{regen\_total}$ produced by the regenerative braking event based on amount of requested brake torque, $t_{demand}$ and wheel speed, $\omega_{sp}$. The system controller 48 may, for instance, multiply the amount of requested brake torque, $t_{demand}$, e.g., as determined by the brake system 50, and the wheel speed, $\omega_{sp}$ received from one or more wheel speed sensors. The system controller 48 may then compare the values of power, $P_{regen\_total}$ and the sum of the values of power, $P_{HV\_loads}$ and charge power limit, $P_{batt\_lim}$ as determined by corresponding sensors, controllers of the vehicle 12, and so on.

At block 66 the system controller 48 may maintain power $P_{regen\_total}$ distribution such that a difference between the regenerative braking event power, $P_{regen\_total}$ and the sum of the power, $P_{HV\_loads}$ consumed by the high voltage loads 46 and the charge power limit, $P_{batt\_lim}$ associated with the traction battery 24 is less than a predefined threshold in response to determining at block 64 that the difference between $P_{regen\_total}$ and the sum of $P_{HV\_loads}$ and $P_{batt\_lim}$ is not greater that, i.e., is less than, a predefined threshold.

At block 68 in response to determining at block 64 that the difference between the amount of power, $P_{regen\_total}$ generated during a given regenerative braking event and the sum of an amount of power, $P_{HV\_loads}$ consumed by the high voltage loads 46 and the charge power limit, $P_{batt\_lim}$ associated with the traction battery 24 is greater than a predefined threshold, the system controller 48 may regulate output voltage of the DC/DC converter 28 such that one or more components of the vehicle 12 connected to the low voltage bus 56, e.g., the low voltage loads 52, the auxiliary battery 30 and so on, receive a portion of power, $P_{regen\_total}$ in excess of the sum of an amount of power, $P_{HV\_loads}$ consumed by the high voltage loads 46 and the value of the charge power limit, $P_{batt\_lim}$ associated with the traction battery 24. In one example, following an adjustment of output voltage of the DC/DC converter 28, a difference between the amount of power, $P_{regen\_total}$ captured during the regenerative braking event and the sum of the charge power limit, $P_{batt\_lim}$ of the traction battery 24, an amount of power, $P_{HV\_loads}$ consumed by the high voltage loads 46, an amount of power, $P_{LV\_loads}$ consumed by the low voltage loads 52, an amount of power, $P_{aux\_batt}$ consumed by the auxiliary battery 30 may be less than a predefined threshold, i.e., $P_{regen\_total} - (P_{batt\_lim} + P_{HV\_loads} + P_{LV\_loads} + P_{aux\_batt}) <$ threshold.

At block 70 the system controller 48 may determine whether a difference between an amount of power, $P_{batt\_meas}$ supplied to the traction battery 24, e.g., as measured by a traction battery sensor, and a charge power limit, $P_{batt\_lim}$ associated with the traction battery 24 is greater than a predefined threshold. The charge power limit, $P_{batt\_lim}$ may be same or different as the charge power limit, $P_{batt\_lim}$ determined at a time when the system controller 48 receives a regenerative braking event notification. In response to determining at block 70 that the difference between the power, $P_{batt\_meas}$ supplied to the traction battery 24 and the charge power limit, $P_{batt\_lim}$ associated with the traction battery 24 is less than a predefined threshold, the system controller 48 may at block 72 maintain power, $P_{regen\_total}$ distribution such that $P_{regen\_total} - (P_{batt\_lim} + P_{HV\_loads} + P_{LV\_loads} + P_{aux\_batt})$ is less than a predefined threshold.

The system controller 48 at block 74 may determine whether an adjustment to an output voltage of the DC/DC converter 28 should be reversed in response to determining at block 70 that the difference between the power, $P_{batt\_meas}$ supplied to the traction battery 24 and the charge power limit, $P_{batt\_lim}$ associated with the traction battery 24 is greater than a predefined threshold. In one example, the system controller 48 may determine whether the adjustment to the output voltage of the DC/DC converter 28 should be reversed, or the output voltage of the DC/DC converter 28 should otherwise regulated, based on whether an amount of power, $P_{regen\_total}$ being captured during a given regenerative braking event is less than a predefined threshold due to, for example, but not limited to, a decrease in amount of requested braking torque, $t_{demand}$, reaching a maximum available amount of torque, and so on.

In response to determining at block 74 that the adjustment to the output voltage of the DC/DC converter 28 should be reversed, the system controller 48 may at block 76 adjust output voltage of the DC/DC converter 28 such that a difference between the power, $P_{batt\_meas}$ supplied to the traction battery 24 and the charge power limit, $P_{batt\_lim}$ associated with the traction battery 24 is less than a predefined threshold. In one example, the system controller 48 may decrease output voltage of the DC/DC converter 28 such that a difference between the power, $P_{batt\_meas}$ supplied to the traction battery 24 and the charge power limit, $P_{batt\_lim}$ associated with the traction battery 24 is less than a predefined threshold.

In response to determining at block 74 that the adjustment to the output voltage of the DC/DC converter 28 should not be reversed, the system controller 48 at block 78 may be configured to, without adjusting the output voltage of the DC/DC converter 28, control distribution of power, $P_{regen\_total}$ such that, for example, a difference between the power, $P_{batt\_meas}$ supplied to the traction battery 24 and the charge power limit, $P_{batt\_lim}$ associated with the traction battery 24 is less than a predefined threshold. In one example, the system controller 48 may control distribution of the power, $P_{regen\_total}$ by increasing power, $P_{regen\_total}$ being captured during a given regenerative braking event, such as additional power available in meeting the requested braking torque, meeting maximum available amount of torque, and so on.

At block 80 the system controller 48 may determine whether a given regenerative braking event has ended. In one example, the system controller 48 may be configured to determine that a given regenerative braking event has ended in response to receiving a signal from one or more controllers, sensors, or other components associated with the vehicle 12, e.g., the brake system 50, the electrical machine 14, and so on.

The system controller 48 may return to block 64 in response to determining at block 80 that the regenerative braking event has not ended, e.g., according to one or more signals from the electrical machines 14, the brake system 50, or another system or sub-system of the vehicle 12. Process 60 may end in response to the system controller 48 determining at block 80 that the regenerative braking event has ended. In one example, the process 60 may be repeated in response to receiving a regenerative braking event notification or in response to another signal or notification. While not specifically indicated in the flowchart as illustrated in FIG. 2, the process 60 may, for instance, include one or more blocks indicative of additional or alternative actions by the system controller 48.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle system comprising:
a voltage converter configured to electrically isolate and convert power transferred between high voltage (HV) and low voltage (LV) busses; and
a controller configured to, responsive to regenerative power exceeding a charge power limit of a traction battery receiving charge via the HV bus, increase an output voltage of the converter to initiate transfer of some of the regenerative power to an auxiliary battery connected with the LV bus.

2. The system of claim 1, wherein the controller is further configured to, responsive to the regenerative power exceeding the charge power limit and a charge power limit of the auxiliary battery, increase friction braking.

3. The system of claim 1, wherein the controller is further configured to regulate a voltage on the HV bus to maintain charging of the traction battery at the charge power limit while the some of the regenerative power is being transferred to the auxiliary battery.

4. The system of claim 1, wherein the controller is further configured to, responsive to the regenerative power being less than the charge power limit, maintain distribution of the regenerative power such that a difference between the regenerative power and total power consumed is less than a threshold.

5. The system of claim 1, wherein the controller is further configured to, responsive to a difference between power measured at the traction battery and the charge power limit being greater than a threshold following the increase, decrease the output voltage.

6. The system of claim 1, wherein the voltage converter is a DC-to-DC converter.

7. The system of claim 1, wherein the regenerative power is generated via application of negative torque by an electric machine responsive to a deceleration request.

8. A method for a vehicle comprising:
responsive to regenerative power being greater than a charge power limit of a traction battery, regulating by a controller an output of a voltage converter configured to electrically isolate and convert power transferred between high voltage (HV) and low voltage (LV) busses such that some of the regenerative power is transferred from the HV bus to the LV bus to charge an auxiliary battery.

9. The method of claim 8 further comprising, responsive to the regenerative power exceeding the charge power limit and a charge power limit of the auxiliary battery, increasing friction braking.

10. The method of claim 8 further comprising regulating a voltage on the HV bus to maintain charging of the traction battery at the charge power limit while the some of the regenerative power is transferred from the HV bus to the LV bus.

11. The method of claim 8 further comprising, responsive to the regenerative power being less than the charge power limit, maintaining distribution of the regenerative power such that a difference between the regenerative power and total power consumed is less than a threshold.

12. The method of claim 8 further comprising, responsive to a difference between power measured at the traction battery and the charge power limit being greater than a threshold following initiation of transfer of the some of the regenerative power, decreasing the output.

13. The method of claim 8, wherein the voltage converter is a DC-to-DC converter.

14. The method of claim 8, wherein the regenerative power is generated via application of negative torque by an electric machine responsive to a deceleration request.

15. A braking system for a vehicle comprising:
an electric machine configured to charge a traction battery via a high voltage (HV) bus by applying opposing torque to a rotational motion of an engine;
a voltage converter configured to electrically isolate and convert power transferred between the HV bus and a low voltage (LV) bus; and
a controller configured to, responsive to an amount of power generated from application of the opposing torque being greater than a charge power limit of the battery, increase an output voltage of the converter to initiate transfer of some of the power to the LV bus.

16. The system of claim 15, wherein the controller is further configured to, responsive to the amount being greater than the charge power limit and a charge power limit of an auxiliary battery connected with the LV bus, increase friction braking.

17. The system of claim 15, wherein the controller is further configured to regulate a voltage on the HV bus to maintain charging of the battery at the charge power limit while the some of the power is being transferred to the LV bus.

18. The system of claim 15, wherein the controller is further configured to, responsive to the power being less than the charge power limit, maintain distribution of the power such that a difference between the power and total power consumed is less than a threshold.

19. The system of claim 15, wherein the controller is further configured to, responsive to a difference between power measured at the traction battery and the charge power limit being greater than a threshold following the increase, decrease the output voltage.

20. The system of claim 15, wherein the voltage converter is a DC-to-DC converter.

* * * * *